H. O. SCRANTON.
CANE STRIPPER AND TOPPER.
APPLICATION FILED FEB. 24, 1919.
1,333,187.
Patented Mar. 9, 1920.
2 SHEETS—SHEET 1.
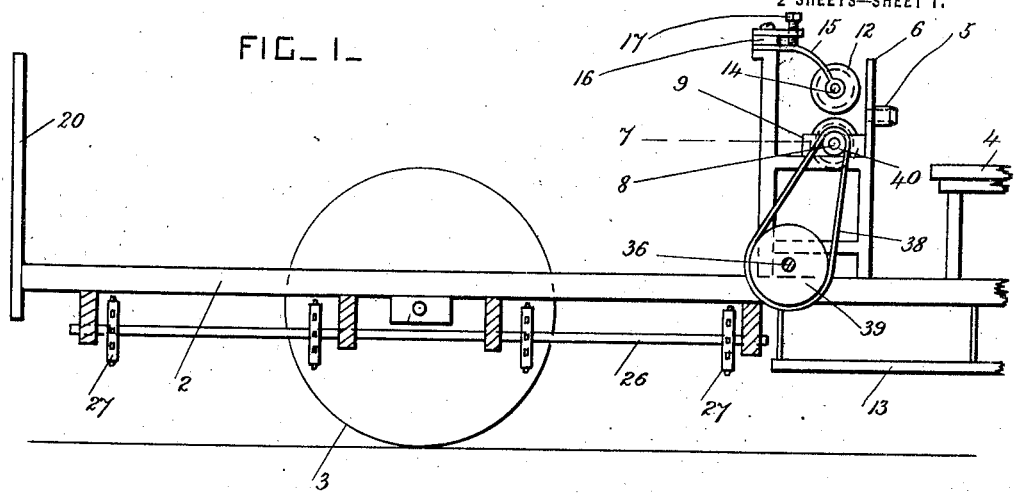
FIG_1_
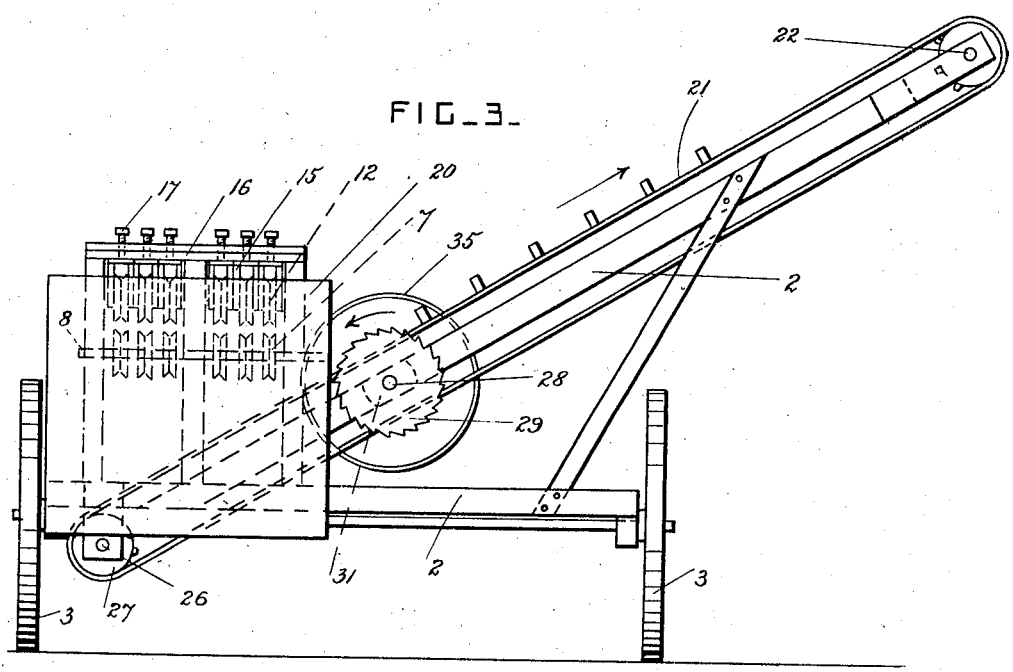
FIG_3_
Inventor
Henry O Scranton
by Herbert W Jenner
Attorney.

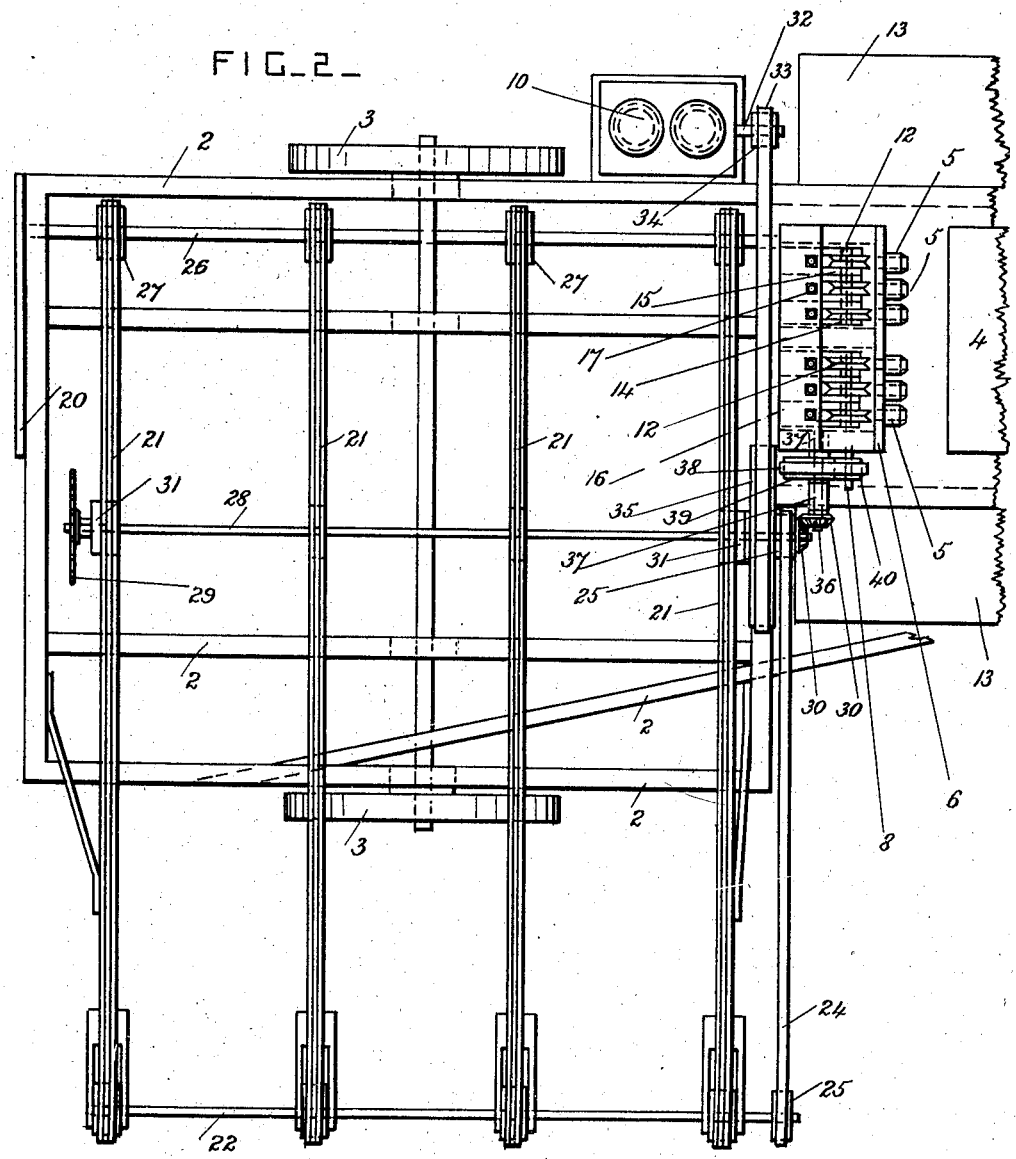

UNITED STATES PATENT OFFICE.

HENRY OSBEST SCRANTON, OF JEANERETTE, LOUISIANA.

CANE STRIPPER AND TOPPER.

1,333,187. Specification of Letters Patent. Patented Mar. 9, 1920.

Application filed February 24, 1919. Serial No. 278,942.

*To all whom it may concern:*

Be it known that I, HENRY O. SCRANTON, a citizen of the United States, residing at Jeanerette, in the parish of Iberia and State of Louisiana, have invented certain new and useful Improvements in Cane Strippers and Toppers, of which the following is a specification.

This invention relates to devices for removing the leaves from sugar canes after the canes have been cut down, and also for removing the upper end portions of the canes; and it consists of portable stripping and topping mechanisms which are actuated by a suitable motor as hereinafter fully described and claimed.

In the drawings, Figure 1 is a side view of a cane stripper and topper constructed according to this invention. Fig. 2 is a plan view of the same. Fig. 3 is a rear end view of the machine.

The machine is provided with a frame 2, which is mounted on ground wheels 3. This frame may be attached to the rear end of a cane harvester of any approved construction, and it is provided with a table 4 or other suitable support at its front end for receiving the canes. Cutters 5 are supported by a plate 6 arranged a little to the rear of the table, and as many cutters as desired can be used. The cutters 5 are arranged in a row and are substantially tubular. The cutters may be cylindrical, or of any other suitable shape or cross section, and they are provided with sharp cutting edges at their front ends.

Rollers 7 are arranged below and behind the cutters 5 and are secured on a shaft 8, journaled in bearings 9, and driven by any suitable motor 10, such as a gasolene engine. Rollers 12 are mounted to revolve over the rollers 7, and the rollers 7 and 12 are grooved or are otherwise constructed so that they will grip the canes tightly. The upper rollers 12 are journaled in bearings 14 on springs 15, which are secured to a support 16, and provided with pressure adjusting screws 17.

If desired, all the rollers may be driven positively by the motor, or additional rollers or pairs of rollers may be placed behind the rollers 7 and 12 to assist them in dragging the canes through the cutters.

The rollers 7 are driven at a relatively high speed so that the cane is pulled rearwardly and is discharged from between the rollers with considerable force. The canes are thrust into the cutters by men who stand on platforms 13, one at each end of the feed table, and the smaller end portions of the canes are seized by the rollers behind the cutters.

A bumper or stop plate 20 is arranged at the rear end of the machine, and the canes strike against this bumper as they are shot from between the rollers 7 and 12. The canes fall upon an endless conveyer 21 of approved construction, which is arranged to travel crosswise of the machine in the space between the cutters and the bumper.

The conveyer 21 is provided with a driving shaft 22 which is driven from the motor by an endless flexible connection or drive chain 24 and drive wheels 25. The lower end portion of the conveyer is supported by a shaft 26 and wheels 27, and the conveyer is arranged in a suitably inclined position so as to discharge the canes from its upper end into a suitable cart or other receptacle.

A topping saw 29 is provided for cutting off the upper end portions of the canes. This saw is arranged to one side of the lower portion of the conveyer, near the bumper, and is secured on a saw shaft 28 journaled in bearings 31 on the frame. The saw shaft is coupled to the shaft 8, by means of beveled toothed wheels 30, or any other suitable driving devices. The motor shaft 32 is connected to the saw shaft 28 by a flexible driving connection 33 and wheels 34 and 35. One of the beveled wheels 30 is secured on a countershaft 36 journaled in bearings 37 on the frame, and the other beveled wheel is secured on the saw shaft. The roller shaft 8 is driven from the countershaft by a flexible driving connection 38 and wheels 39 and 40, but any other approved driving devices may be used between the different shafts of the machine.

What I claim is:

1. The combination, with a cane stripping machine provided with rollers which project the canes rearwardly and horizontally after they leave the stripping devices, of a vertical bumper arranged to the rear of the said machine in the rearward path of the stripped canes and operating to arrest them and even their tops, a topping saw arranged parallel to and in advance of the said bumper, and means for supporting the canes after they strike the bumper and while the saw is cutting off their top end portions.

2. The combination, with a cane stripping machine provided with rollers which project the cane rearwardly and horizontally after they leave the stripping devices, of a vertical bumper arranged to the rear of the said machine in the rearward path of the stripped canes and operating to arrest them and even their tops, a topping saw arranged parallel to and in advance of the said bumper, and an inclined conveyer arranged to work crosswise of the bumper and operating to support the canes after they strike the bumper and while the saw is cutting off their top end portions.

In testimony whereof I have affixed my signature.

HENRY OSBEST SCRANTON.